(12) United States Patent
Si

(10) Patent No.: US 11,956,778 B2
(45) Date of Patent: Apr. 9, 2024

(54) CHANNEL ACCESS RESPONSE IN UPLINK TRANSMISSION

(71) Applicant: Samsung Electronics Co., Ltd., Suwon-si (KR)

(72) Inventor: Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 17/447,799

(22) Filed: Sep. 15, 2021

(65) Prior Publication Data

US 2022/0095340 A1 Mar. 24, 2022

Related U.S. Application Data

(60) Provisional application No. 63/082,199, filed on Sep. 23, 2020.

(51) Int. Cl.
| | |
|---|---|
| *H04W 72/12* | (2023.01) |
| *H04L 1/1812* | (2023.01) |
| *H04L 1/1867* | (2023.01) |
| *H04W 16/28* | (2009.01) |
| *H04W 72/04* | (2023.01) |
| *H04W 72/0446* | (2023.01) |
| *H04W 72/0453* | (2023.01) |
| *H04W 72/1273* | (2023.01) |
| *H04W 72/21* | (2023.01) |
| *H04W 72/54* | (2023.01) |

(52) U.S. Cl.
CPC ....... *H04W 72/1273* (2013.01); *H04L 1/1819* (2013.01); *H04L 1/1896* (2013.01); *H04W 16/28* (2013.01); *H04W 72/0446* (2013.01); *H04W 72/0453* (2013.01); *H04W 72/21* (2023.01); *H04W 72/54* (2023.01)

(58) Field of Classification Search
CPC combination set(s) only.
See application file for complete search history.

(56) References Cited

U.S. PATENT DOCUMENTS

| | | | | |
|---|---|---|---|---|
| 2017/0346543 | A1* | 11/2017 | Islam | H04B 7/0417 |
| 2019/0230706 | A1* | 7/2019 | Li | H04B 7/088 |
| 2021/0091827 | A1* | 3/2021 | Namba | H04B 17/309 |
| 2021/0100059 | A1* | 4/2021 | Xu | H04B 7/0695 |

(Continued)

FOREIGN PATENT DOCUMENTS

WO WO-2020054607 A1 * 3/2020 ........... H04B 7/0456

OTHER PUBLICATIONS

International Search Report and Written Opinion dated Jan. 4, 2022 regarding Application No. PCT/KR2021/012944, 7 pages.

(Continued)

*Primary Examiner* — Phong La

(57) ABSTRACT

Apparatuses and methods for channel access responses in uplink transmissions. A method of operating a user equipment (UE) includes receiving, from a base station (BS), a channel access request (CARQ) over a downlink channel and generating a channel access response (CARP). The CARP includes a response to information indicated in the CARQ. The method further includes including the CARP in uplink control information (UCI), determining a set of time or frequency domain resources for transmitting the UCI, and transmitting the UCI based on the determined set of time or frequency domain resources.

17 Claims, 7 Drawing Sheets

(56) References Cited

U.S. PATENT DOCUMENTS

2021/0144743 A1* 5/2021 Rastegardoost ...... H04W 72/23
2022/0095340 A1* 3/2022 Si ........................ H04B 7/088

OTHER PUBLICATIONS

Ericsson, "Channel access procedures", 3GPP TSG-RAN WG1 Meeting #98, R1-1909298, Aug. 2019, 8 pages.
Samsung, "Channel access mechanism for 60 GHz unlicensed spectrum", 3GPP TSG RAN WG1 #102-e, R1-2006137, Aug. 2020, 3 pages.
Nokia et al., "Feature Lead's Summary on Channel Access Procedures", 3GPP TSG RAN WG1 Meeting #98, R1-1908681, Aug. 2019, 26 pages.
AT&T, "Design of channel access procedures for NR-based access to unlicensed spectrum", 3GPP TSG RAN WG1 #97, R1-1907160, May 2019, 4 pages.
"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)" 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
Extended European Search Report dated Aug. 7, 2023 regarding Application No. 21872898.8, 6 pages.

* cited by examiner

CHANNEL ACCESS RESPONSE IN UPLINK TRANSMISSION

CROSS-REFERENCE TO RELATED APPLICATIONS AND CLAIM OF PRIORITY

The present application claims priority to U.S. Provisional Patent Application No. 63/082,199, filed on Sep. 23, 2020. The content of the above-identified patent document is incorporated herein by reference.

TECHNICAL FIELD

The present disclosure relates generally to wireless communication systems and, more specifically, the present disclosure relates to a channel access response in an uplink transmission.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include, for example, massive antenna technologies, from legacy cellular frequency bands up to high frequencies, to provide beamforming gain and support increased capacity, new waveform (e.g., a new radio access technology (RAT)) to flexibly accommodate various services/applications with different requirements, and new multiple access schemes to support massive connections.

SUMMARY

The present disclosure relates to wireless communication systems and, more specifically, the present disclosure relates to a channel access response in an uplink transmission.

In one embodiment, a base station (BS) in a wireless communication system including a carrier operating with shared spectrum channel access is provided. The BS includes a transceiver configured to transmit, to a user equipment (UE), a channel access request (CARQ) over a downlink channel. The BS further includes a processor operably coupled to the transceiver. The processor is configured to determine a set of time or frequency domain resources for receiving uplink control information (UCI). The UCI includes a channel access response (CARP), and the CARP includes a response to information indicated in the CARQ. The transceiver is further configured to receive the UCI based on the determined set of time or frequency domain resources.

In another embodiment, a UE in a wireless communication system is provided. The UE includes a transceiver configured to receive, from a BS, a CARQ over a downlink channel. The UE further includes a processor operably coupled to the transceiver. The processor configured to generate a CARP. The CARP includes a response to information indicated in the CARQ. The processor further configured to include the CARP in UCI and determine a set of time or frequency domain resources for transmitting the UCI. The transceiver is further configured to transmit the UCI based on the determined set of time or frequency domain resources.

In yet another embodiment, a method of operating a UE in a wireless communication system is provided. The method includes receiving, from a BS, a CARQ over a downlink channel and generating a CARP. The CARP includes a response to information indicated in the CARQ. The method further includes including the CARP in UCI, determining a set of time or frequency domain resources for transmitting the UCI, and transmitting the UCI based on the determined set of time or frequency domain resources.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
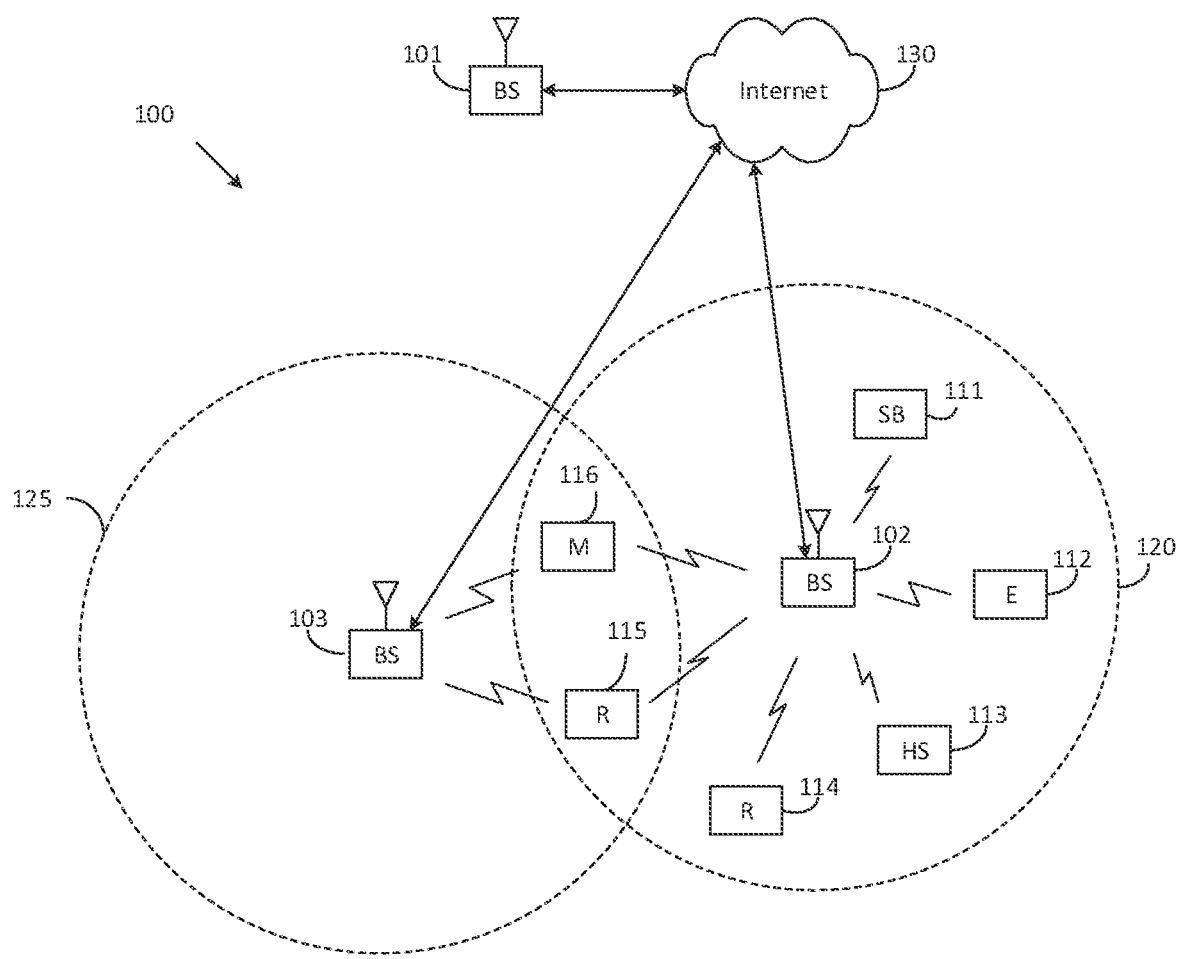
FIG. 1 illustrates an example wireless network according to various embodiments of the present disclosure.

FIG. 1 through FIG. 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; and 3GPP TS 38.331 v16.1.0, "NR; Radio Resource Control (RRC) Protocol Specification."

To meet the demand for wireless data traffic having increased since deployment of the fourth generation (4G) communication systems, and to enable various vertical applications, 5G communication systems have been developed and are currently being deployed.

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNodeB (gNB), a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
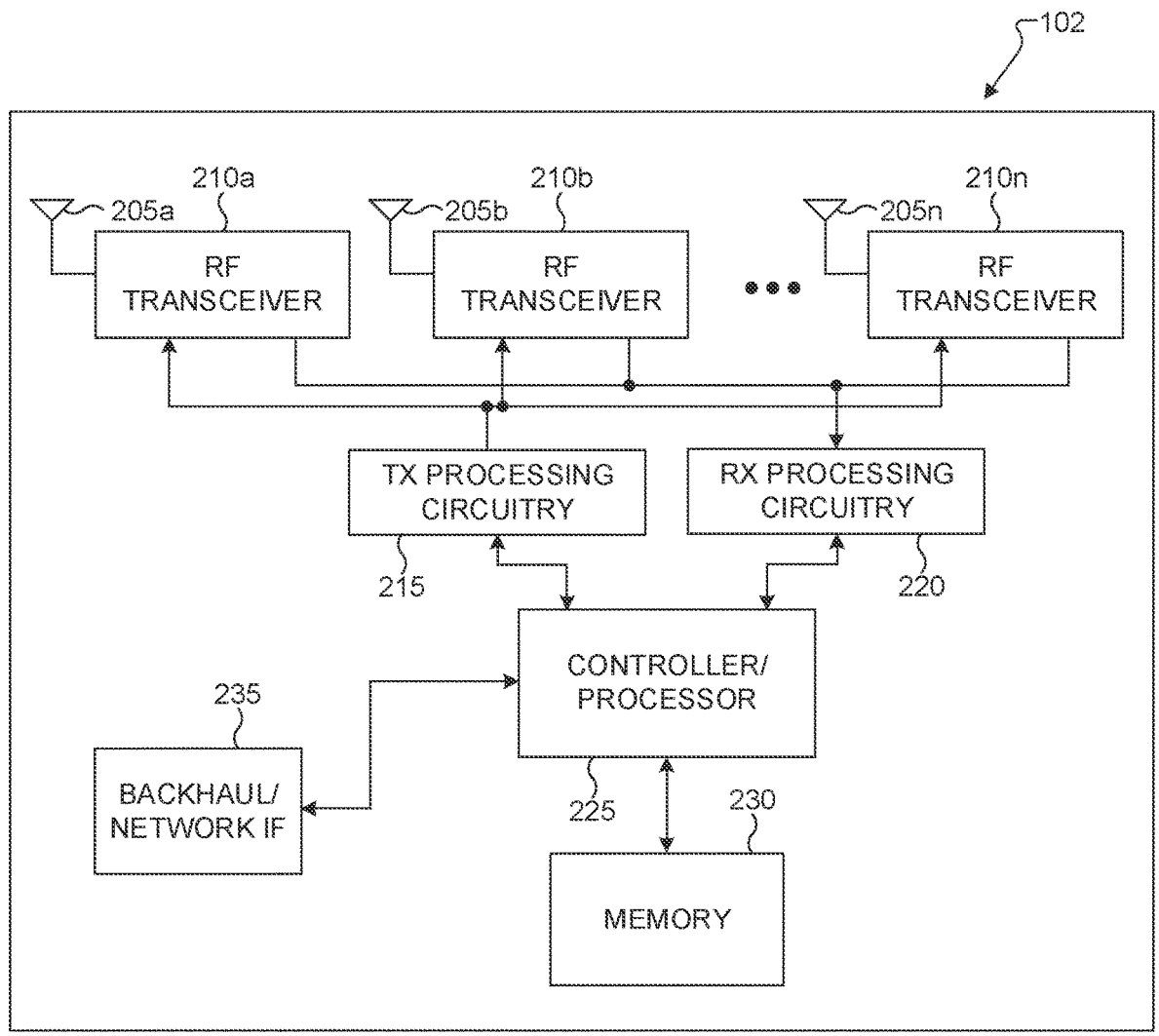
FIG. 2 illustrates an example gNB according to various embodiments of the present disclosure.
Figure 3:
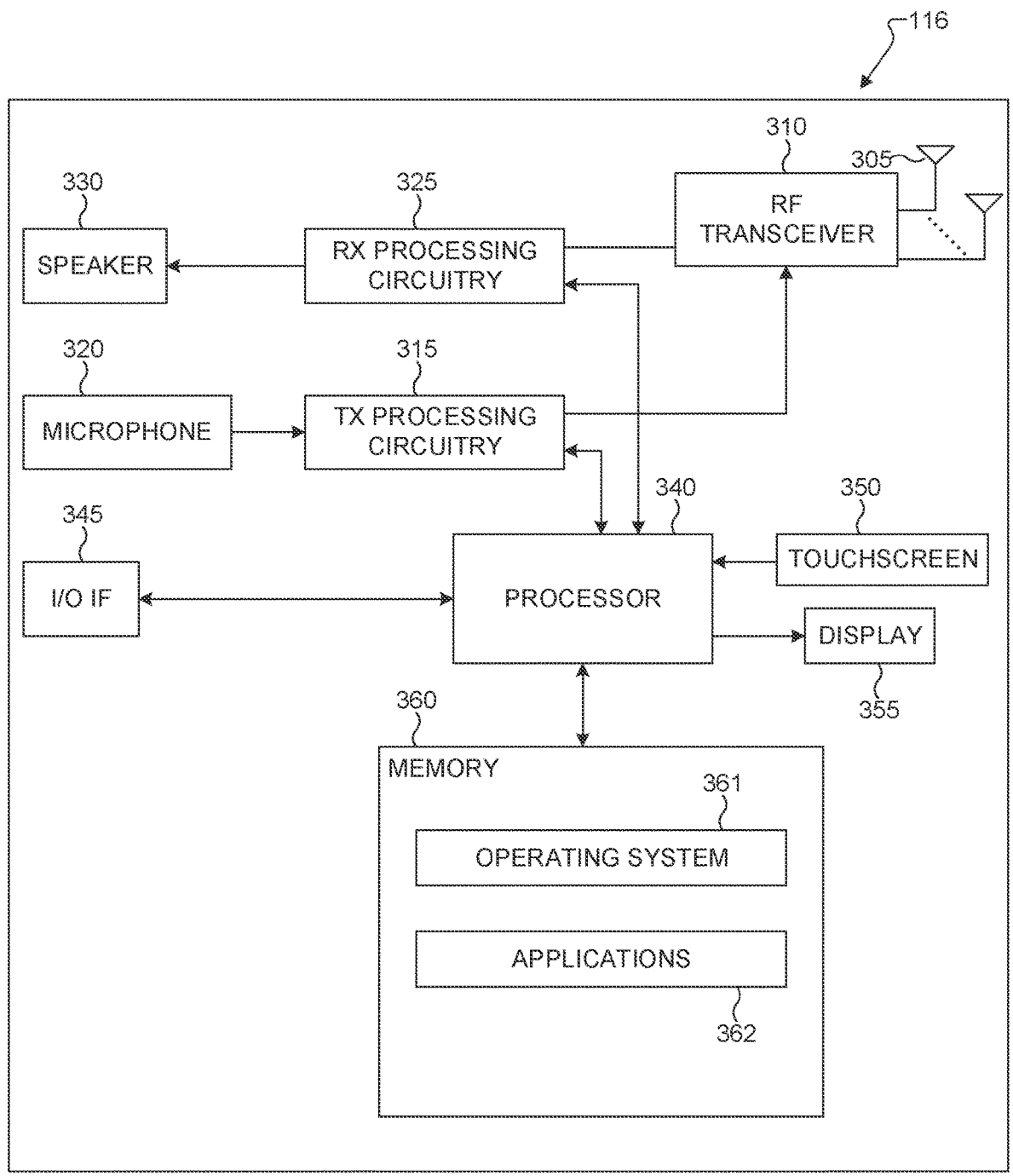
FIG. 3 illustrates an example UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, LTE, LTE-A, high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a channel access request in downlink transmission. In certain embodiments, and one or more of the gNBs 101-103 includes circuitry, programing, or a combination thereof, for a channel access request in downlink transmission.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) channel signals and the transmission of downlink (D)L channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a channel access request in downlink transmission. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

A communication system includes a DL that refers to transmissions from a base station or one or more transmission points to UEs and an UL that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
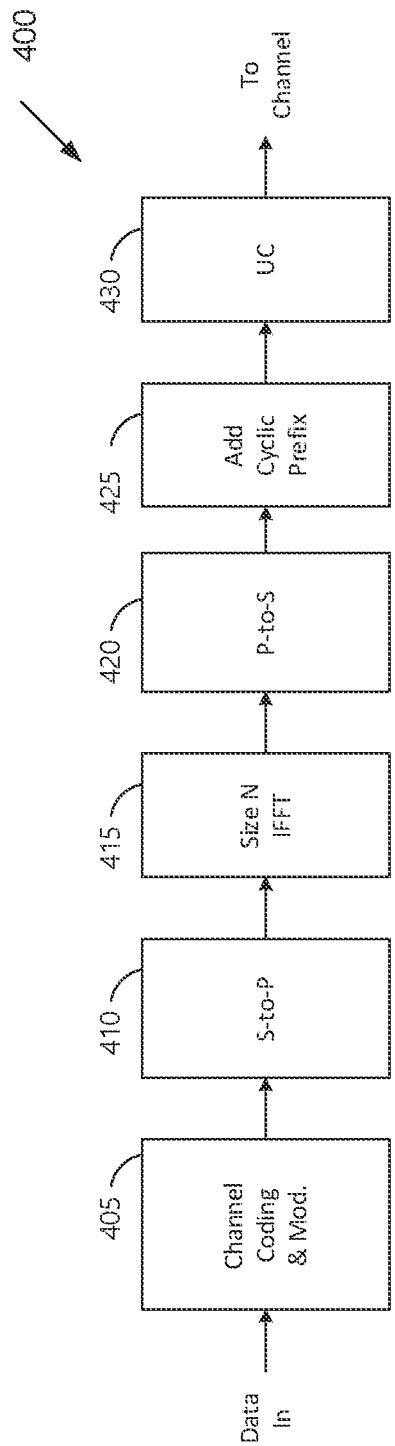
FIGS. 4 and 5 illustrate example wireless transmit and receive paths according to various embodiments of the present disclosure.
Figure 5:
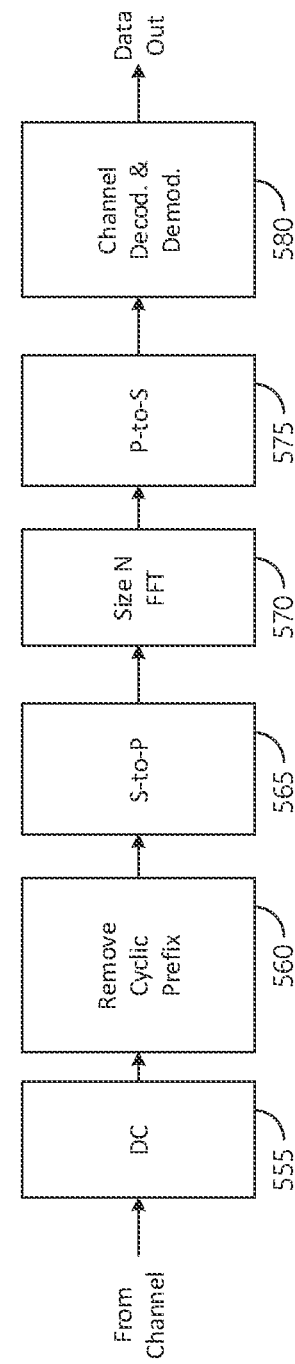

FIG. 4 and FIG. 5 illustrate example wireless transmit and receive paths according to the present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the beam indication channel in a multi-beam system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of the present disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Various embodiments of the present disclosure focus on the design of channel access response (CARP) in response to channel access request (CARQ) in a directional transmission. General aspects of the feature for channel access response (CARP), as well as information generation for CARP and resource set for CARP are covered. More precisely, the following components are included in the present disclosure.

In various embodiments of the present disclosure, an uplink control information (UCI) based CARP in physical uplink control channel (PUCCH) is provided, an UCI based CARP in physical uplink shared channel (PUSCH) is provided, and a reference signal (RS) based CARP is provided.

In NR Rel-16, operation with shared spectrum channel access has been supported for 5 GHz unlicensed band and 6 GHz unlicensed band. More precisely, two types of channel access procedures are supported, wherein Type 1 channel access procedure includes a random time duration of channel sensing before a downlink transmission, and Type 2 channel access procedure includes a deterministic time duration (e.g., including zero duration) of channel sensing before a downlink transmission.

For higher carrier frequency range, for example 60 GHz unlicensed spectrum, transmissions may utilize highly-directional beamforming. To support this, the corresponding channel sensing could also be configured to be highly-directional, in order to save sensing energy on directions not related to the intended transmission, wherein the new type of sensing is referred to as directional channel sensing, to be distinguished from classical omni-directional channel sensing. However, in directional channel sensing, the antenna direction for sensing the channel is not aligned with the direction for transmission. For example, a transmitter operating with highly directional antenna performs directional channel sensing to acquire the interference situation only in the direction from the receiver to the transmitter, but by only performing the sensing at the transmitter side, the interference situation in the direction from the transmitter to the receiver is still unknown to the transmitter. In other words, the direction for sensing is opposite to the direction for transmission, so the interference situation in the directional channel sensing procedure is not aligned with the actual interference situation when transmitting directionally on the channel. This mismatch may cause issue with performance degradation due to an incorrect estimation of the interference situation at the receiver, and the present disclosure is focusing on resolving the mismatch issue by using a CARP in the uplink transmission, wherein the CARP indicates the channel sensing result at the receiver, according to the mentioned embodiments/examples in the present disclosure.

Although exemplary descriptions and embodiments to follow assume OFDM or OFDMA, the present disclosure can be extended to other OFDM-based transmission waveforms or multiple access schemes such as filtered OFDM (F-OFDM).

The present disclosure covers several components which can be used in conjunction or in combination with one another or can operate as standalone schemes.

In one embodiment, a CARP can be associated with a channel access request (CARQ), wherein the CARQ can be used for requesting the occupancy of a channel. The CARP is used for confirming the occupancy of the channel, as requested by CARQ. In one example, CARQ is transmitted in a downlink channel and the CARP is transmitted on an uplink channel.

Figure 6:
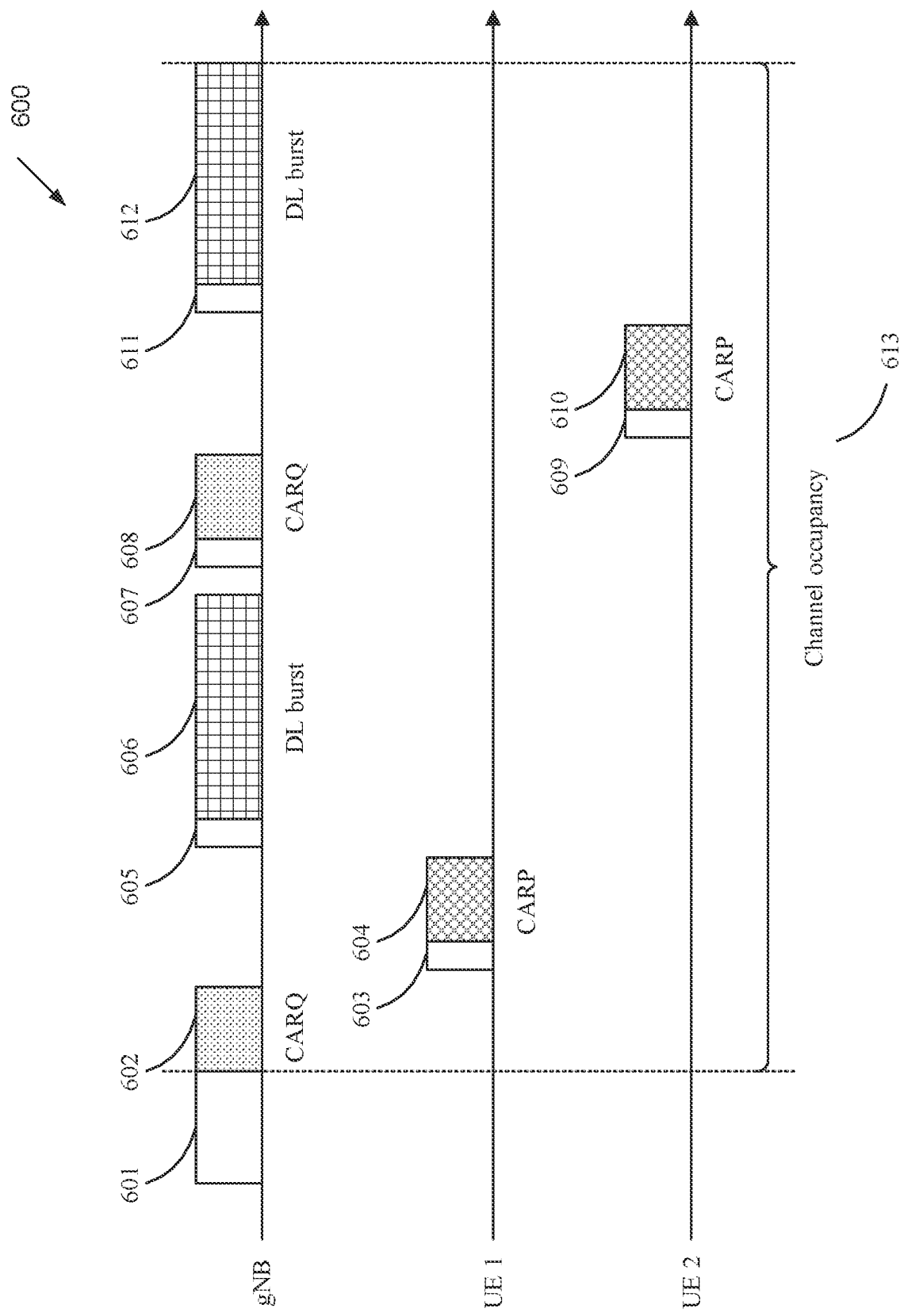
FIG. 6 illustrates an example timing diagram for a CARQ and CARP according to various embodiments of the present disclosure.

FIG. 6 illustrates an example timing diagram 600 for a CARQ and CARP according to embodiments of the present disclosure. An embodiment of the timing diagram 600 for the CARQ and CARP shown in FIG. 6 is for illustration only.

In one example, the CARQ can be sent at the beginning of a gNB's initialized channel occupancy, as illustrated in 602 of FIG. 6, after the channel sensing procedure (601 as illustrated in FIG. 6) associated with the channel occupancy initialized by the gNB (613 in FIG. 6).

In another example, the CARQ can be sent within a gNB's initialized channel occupancy, as illustrated in 608 of FIG. 6, after a potential channel sensing procedure (607 in FIG. 6).

Figure 7:
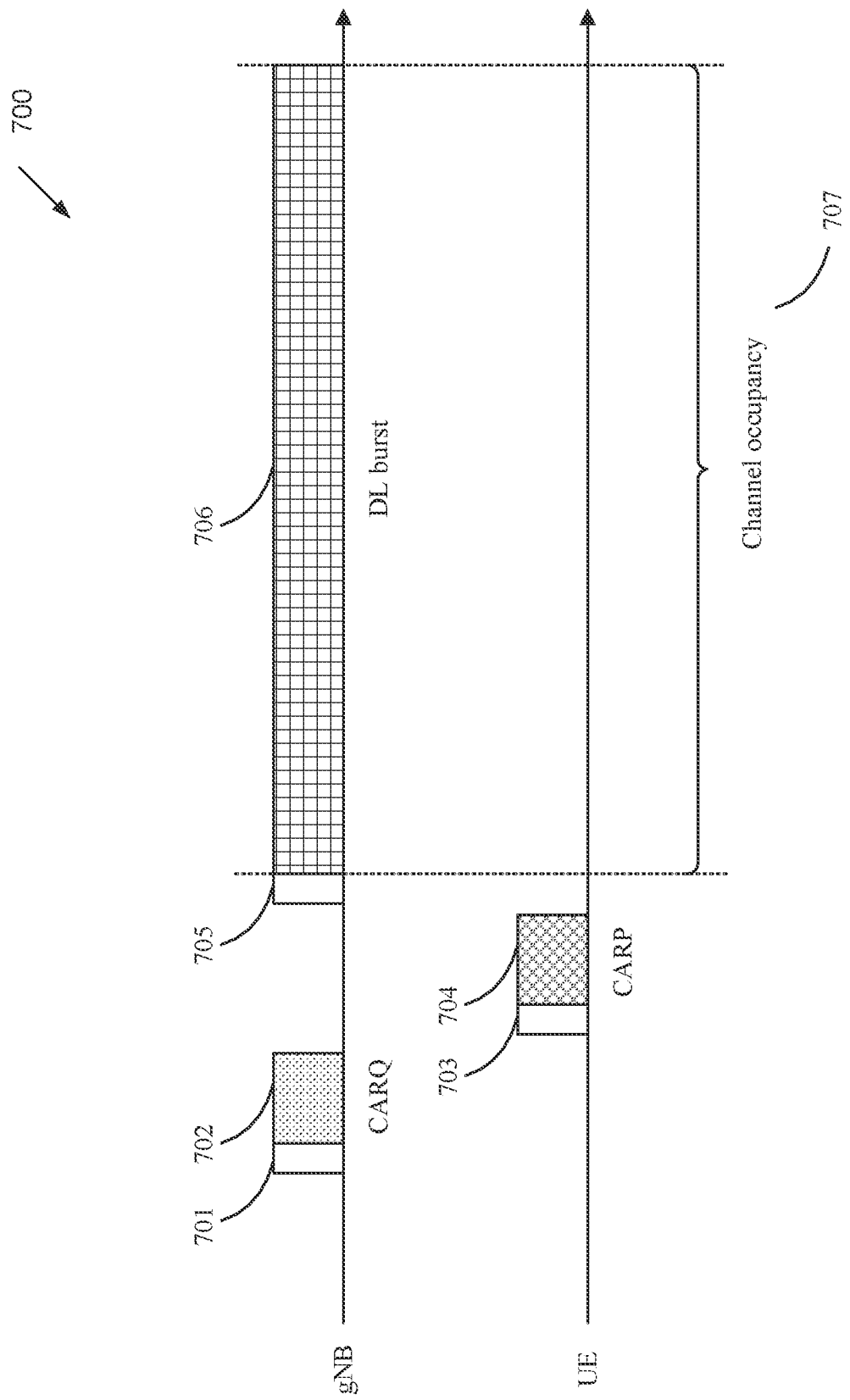
FIG. 7 illustrates another example timing diagram for a CARQ and CARP according to various embodiments of the present disclosure.

FIG. 7 illustrates another example timing diagram 700 for a CARQ and CARP according to embodiments of the present disclosure. An embodiment of the timing diagram 700 for the CARQ and CARP shown in FIG. 7 is for illustration only.

In yet another example, the CARQ can be sent outside a gNB's initialized channel occupancy, as illustrated in 702 of FIG. 7, after the channel sensing procedure (701 in FIG. 7) associated with the CARQ.

In one example, a CARQ can be associated with at least one CARP sent by the UE addressed in the CARQ (e.g., 604 and 610 in FIG. 6, or 704 in FIG. 7), wherein the CARP includes report of the channel sensing results for the beam directions included in the CARQ, and the gNB can only initialize the DL burst transmissions (e.g., 606 and 612 in FIG. 6, or 706 in FIG. 7) after the CARP declares the channel as available for transmission from the UE side. The declaration of the channel as available for transmission can be based on at least one of an energy detection based channel sensing, a RRM measurement including reference signal received power (RSRP)/reference signal received quality (RSRQ), a received signal strength indicator (RSSI) measurement, or a CSI measurement.

In one instance, the support of the CARP functionality can be a UE capability. In one example, the support of the CARP functionality is limited to RRC_CONNECTED UEs.

In one embodiment, CARP at least contains an indication of beam direction(s) for responding to the channel occupancy situation.

In one example, an indication of one beam direction for responding to the channel occupancy situation include one of two states. For example, BUSY or IDLE, wherein a beam direction indicated as BUSY refers to the channel is occupied or not allowed for transmission, and a beam direction indicated as IDLE refers to the channel is not occupied and allowed for transmission. In another example, the state of BUSY or IDLE can be determined based on comparing a measurement result with a threshold, wherein the measurement result can be at least one of an energy detection based channel sensing (e.g., LBT based sensing), a RSSI measurement, a RSRP measurement, a RSRQ measurement, or a signal to interference and noise ratio (SINR) measurement.

In another example, an indication of one beam direction for responding to the channel occupancy situation include one of three states. For example, BUSY or IDLE or NaN, wherein a beam direction indicated as BUSY refers to the channel is occupied or not allowed for transmission, a beam direction indicated as IDLE refers to the channel is not occupied and allowed for transmission, and a beam direction indicated ad NaN refers to no information available for the channel. In another example, the state of BUSY or IDLE can be determined based on comparing a measurement result with a threshold, wherein the measurement result can be at least one of an energy detection based channel sensing (e.g., LBT based sensing), a RSSI measurement, a RSRP measurement, a RSRQ measurement, or a SINR measurement.

In yet another example, an indication of one beam direction for responding to the channel occupancy situation includes a measurement result for such beam direction, wherein the measurement result can be at least one of an energy detection based channel sensing (e.g., LBT based sensing), a RSSI measurement, a RSRP measurement, a RSRQ measurement, or a SINR measurement. In another example, the measurement result can be quantized into a smaller number of bits to save the overhead of the measurement result.

For the beam direction included in the CARP, at least one of the following examples can be utilized. In one example, the CARQ can include an indication of a list of at least one transmission configuration indicator (TCI) state associated with the PDSCH in the corresponding DL burst, and the CARP associated with the CARQ can include a set of at least one states or one measurement results for responding to the channel occupancy situation, wherein each state or measurement results corresponds to one TCI state in the list of the at least one TCI state in the CARQ. For example, the set of states or measurement results for channel access responses can be denoted as $\{o_0^{CARP}, o_1^{CARP}, \ldots, o_{N-1}^{CARP}\}$, where N is the number of TCI states for channel access request in CARQ, and $o_i^{CARP}$ is determined as one state or one measurement results for channel occupancy situation according to the mentioned embodiments/examples in the present disclosure.

In another example, the CARQ can include an indication of a bitmap with the length of all the TCI states. A bit in the bitmap corresponds to one TCI state associated with a PDSCH in the corresponding DL burst, and the bit taking value of 1 indicates a channel access request for the corresponding TCI state. The CARP associated with the CARQ can include a set of at least one states or at least one measurement results for responding to the channel occupancy situation, wherein each state or measurement result corresponds to one TCI state in the list of the at least one TCI state in the CARQ. For example, the set of states or measurement results for channel access responses can be denoted as $\{o_0^{CARP}, o_1^{CARP}, \ldots, o_{N-1}^{CARP}\}$, where N is the length of the bitmap in CARQ, and $o_i^{CARP}$ is determined as one state or one measurement result for channel occupancy situation according to the mentioned embodiments/examples in the present disclosure.

In yet another example, CARQ includes an indication of a bitmap with length of maximum number of SS/PBCH block indexes in a cell. A bit in the bitmap corresponds to one SS/PBCH block index, and the bit taking value of 1 indicates a channel access request for the transmission QCLed with the SS/PBCH block with index corresponding to the bit in the bitmap. The CARP associated with the CARQ can include a set of at least one states or one measurement results for responding to the channel occupancy situation, wherein each state or each measurement result corresponds to a transmission direction QCLed with the SS/PBCH block with index corresponding to the bit in the bitmap in the CARQ. For example, the set of states or measurement results for channel access responses can be denoted as $\{o_0^{CARP}, o_1^{CARP}, \ldots, o_{N-1}^{CARP}\}$, where N is the length of the bitmap in CARQ, and $o_i^{CARP}$ is determined as one state or one measurement result for channel occupancy situation according to the mentioned embodiments/examples in the present disclosure.

A bit sequence $b_0, b_1, \ldots, b_{O^{CARP}-1}$ can be determined from the set of states or measurement results for channel access responses. In one example, the bit sequence $b_0, b_1, \ldots, b_{O^{CARP}-1}$ can be determined by setting $$b_i = \begin{cases} 1, & \text{if } o_i^{CARP} = \text{BUSY} \\ 0, & \text{if } o_i^{CARP} = \text{IDLE} \end{cases}$$

or $$b_i = \begin{cases} 0, & \text{if } o_i^{CARP} = \text{BUSY} \\ 1, & \text{if } o_i^{CARP} = \text{IDLE} \end{cases}$$

for $i=0, 1, \ldots, N^{CARP}-1$, and $O^{CARP}=N^{CARP}$ wherein $o_i^{CARP}$ is the i-th channel access response with two possible states and $N^{CARP}$ is the total number of channel access responses in the CARP, according to the mentioned embodiments/examples in the present disclosure.

In another example, the bit sequence $b_0, b_1, \ldots, b_{O^{CARP}-1}$ is determined by setting $$b_{2i}b_{2i+1} = \begin{cases} 01, & \text{if } o_i^{CARP} = \text{BUSY} \\ 00, & \text{if } o_i^{CARP} = \text{IDLE} \\ 11, & \text{if } o_i^{CARP} = \text{NaN} \end{cases}$$

or $$b_{2i}b_{2i+1} = \begin{cases} 00, & \text{if } o_i^{CARP} = \text{BUSY} \\ 01, & \text{if } o_i^{CARP} = \text{IDLE} \\ 11, & \text{if } o_i^{CARP} = \text{NaN} \end{cases}$$

for $i=0, 1, \ldots, N^{CARP}-1$, and $O^{CARP}=c \cdot N^{CARP}$ wherein $o_i^{CARP}$ is the i-th channel access response with three possible states and $N^{CARP}$ is the total number of channel access responses in the CARP, according to the mentioned embodiments/examples in the present disclosure.

In yet another example, the bit sequence $b_0, b_1, \ldots, b_{O^{CARP}-1}$ is determined by setting $$b_{c \cdot i} \ldots b_{c \cdot (i+1)-1} = f(o_i^{CARP})$$

for $i=0, 1, \ldots, N^{CARP}-1$, and $O^{CARP}=c \cdot N^{CARP}$ wherein $o_i^{CARP}$ is the i-th channel access response with measurement result, c is the number of bits for each measurement result after potential quantization procedure $f(\bullet)$, and $N^{CARP}$ is the total number of channel access responses in the CARP, according to the mentioned embodiments/examples in the present disclosure.

In one example, the time and/or frequency domain resource set for the associated CARP is known to the UE, when the time and/or frequency domain resource set for CARQ is known to the UE. For example, there is a one-to-one mapping between the time and/or frequency domain resource set for the associated CARP and the time and/or frequency domain resource set for CARQ, wherein the mapping is known to the UE, and the UE can determine the time and/or frequency domain resource set for the associated CARP based on the time and/or frequency domain resource set of CARQ.

In another example, the time and/or frequency domain resource set for the associated CARP is indicated by CARQ. For example, CARQ indicates the time domain and/or frequency domain resource set for the associated CARP.

In yet another example, the time and/or frequency domain resource set for the CARP is pre-configured, and the UE can determine time and/or frequency domain resource set for the CARP based on the pre-configuration. For example, the pre-configuration can be provided by higher layer parameters (RRC parameters).

In yet another example, the time and/or frequency domain resource set for the CARP can be indicated by a DCI format.

In yet another example, UE can determine the time and/or frequency domain resource set for CARP using a hybrid method from above examples/embodiments mentioned in the present disclosure. For example, one parameter of a time domain or frequency domain resource set for CARP can use one embodiment/example mentioned in the present disclosure, and another parameter of a time domain or frequency domain resource set for CARP can use another embodiment/example mentioned in the present disclosure.

Figure 8:
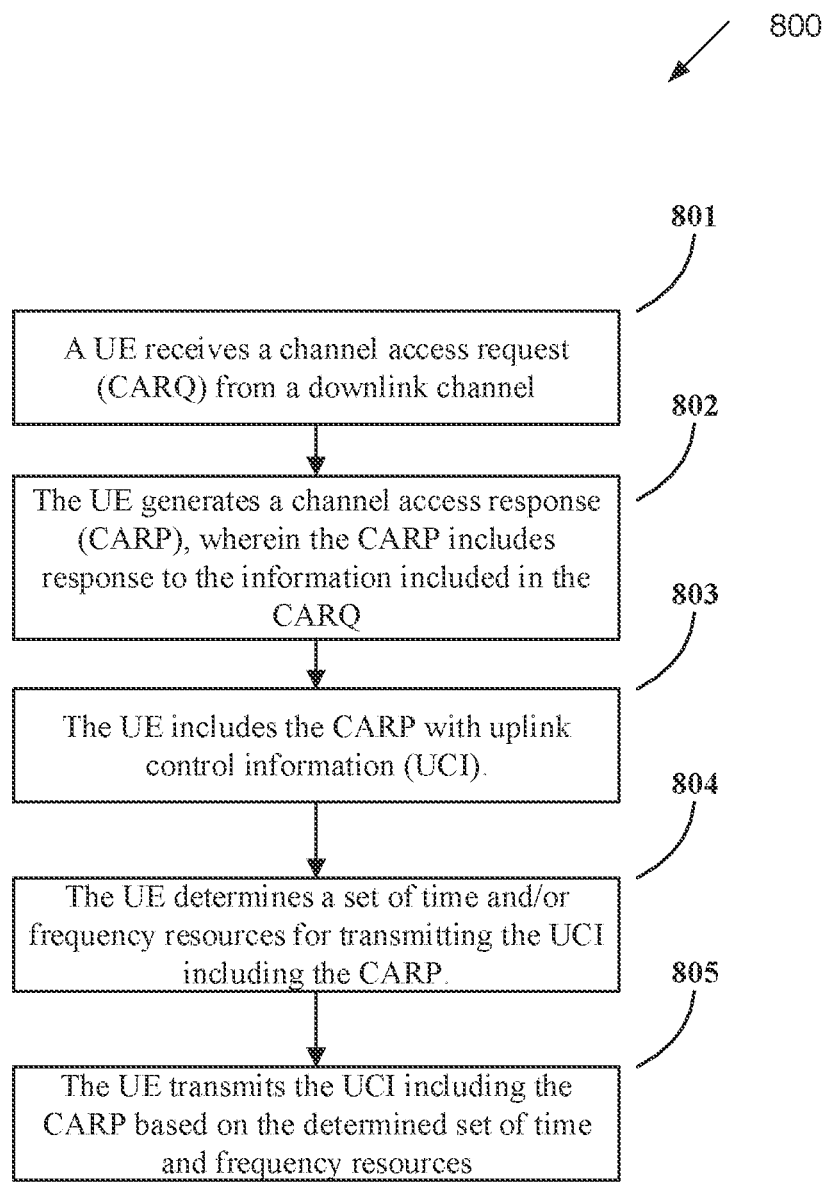
FIG. 8 illustrates a flowchart of a method for an operation of UE to generate CARP in response to CARQ, according to embodiments of the present disclosure.

FIG. 8 illustrates a flowchart of a method 800 for an operation of UE to generate CARP in response to CARQ, according to embodiments of the present disclosure. The method 800 as may be performed by a UE (e.g., any of UEs 111-116 as illustrated in FIG. 1). An embodiment of the method 800 shown in FIG. 8 is for illustration only.

As illustrated in FIG. 8, a UE first receives a CARQ from a downlink channel (step 801) and generates a CARP according to the examples in this disclosure (step 802), wherein the CARP includes response to the information included in the CARQ. The UE includes the CARP with UCI (step 803). The UE further determines a set of time and/or frequency domain resources for transmitting the UCI including the CARP according to the examples in this disclosure (step 804) and transmits the UCI including the CARP based on the determined set of time and/or frequency domain resources (step 805).

In one embodiment, the CARP can be included in UCI and transmitted by a PUCCH. In one example, the CARP can be the only component included in the UCI. For example, the UCI bit sequence $a_0, a_1, \ldots, a_{A-1}$ can be determined from the set of states or measurement results for channel access responses as the bit sequence $b_0, b_1, \ldots, b_{O^{CARP}-1}$, according to the mentioned embodiments/examples in the present disclosure, wherein $a_i = b_i$ and $A = O^{CARP}$.

In another example, the CARP can be multiplexed with hybrid automatic repeat request acknowledgement (HARQ-ACK) or scheduling request (SR) and included in the UCI. For example, the UCI bit sequence $a_0, a_1, \ldots, a_{A-1}$ can be determined according to the following, where $A = O^{ACK} + O^{SR} + O^{CARP}$: (1) if there is HARQ-ACK for transmission on PUCCH, the HARQ-ACK bits are mapped to the UCI bit sequence $a_0, a_1, \ldots, a_{O^{ACK}-1}$ and if there is no HARQ-ACK for transmission on PUCCH, set $O^{ACK}=0$; (2) if there is SR for transmission on PUCCH, the SR bits are mapped to the UCI bit sequence $a_{O^{ACK}}, a_{O^{ACK}+1}, \ldots, a_{O^{ACK}+O^{SR}-1}$ and if there is no SR for transmission on PUCCH, set $O^{SR}=0$ (3) if there is CARP for transmission on PUCCH, the CARP bits are mapped to the UCI bit sequence $a_{O^{ACK}+O^{SR}}, a_{O^{ACK}+O^{SR}+1}, \ldots, a_{O^{ACK}+O^{SR}+O^{CARP}-1}$.

In another example, the UCI bit sequence $a_0, a_1, \ldots, a_{A-1}$ can be determined according to the following, where $A = O^{ACK} + O^{CARP} + O^{SR}$: (1) if there is HARQ-ACK for transmission on PUCCH, the HARQ-ACK bits are mapped to the UCI bit sequence $a_0, a_1, \ldots, a_{O^{ACK}-1}$ and if there is no HARQ-ACK for transmission on PUCCH, set $O^{ACK}=0$; (2) if there is CARP for transmission on PUCCH, the CARP bits are mapped to the UCI bit sequence $a_{O^{ACK}}, a_{O^{ACK}+1}, \ldots, a_{O^{ACK}+O^{CARP}-1}$ and if there is no CARP for transmission on PUCCH, set $O^{CARP}=0$; (3) if there is SR for transmission on PUCCH, the SR bits are mapped to the UCI bit sequence $a_{O^{ACK}+O^{CARP}}, a_{O^{ACK}+O^{CARP}+1}, \ldots, a_{O^{ACK}+O^{CARP}+O^{SR}-1}$.

In yet another example, the UCI bit sequence $a_0, a_1, \ldots, a_{A-1}$ can be determined according to the following, where $A = O^{CARP} + O^{ACK} + O^{SR}$: (1) if there is CARP for transmission on PUCCH, the CARP bits are mapped to the UCI bit sequence $a_0, a_1, \ldots, a_{O^{CARP}-1}$ and if there is no CARP for transmission on PUCCH, set $O^{CARP}=0$; (2) if there is HARQ-ACK for transmission on PUCCH, the HARQ-ACK bits are mapped to the UCI bit sequence $a_{O^{CARP}}, a_{O^{CARP}+1}, \ldots, a_{O^{CARP}+O^{ACK}-1}$ and if there is no HARQ-ACK for transmission on PUCCH, set $O^{ACK}=0$; (3) if there is SR for transmission on PUCCH, the SR bits are mapped to the UCI bit sequence $a_{O^{CARP}+O^{ACK}}, a_{O^{CARP}+O^{ACK}+1}, \ldots, a_{O^{CARP}+O^{ACK}+O^{SR}-1}$.

In another embodiment, the CARP can be multiplexed with CSI and included in the UCI. In one example, if none of the CSI reports for transmission on a PUCCH is of two parts, the UCI bit sequence $a_0, a_1, \ldots, a_{A-1}$ can be determined according to the following, where $A = O^{CARP} + O^{CSI}$: (1) if there is CARP for transmission on PUCCH, the CARP bits are mapped to the UCI bit sequence $a_0, a_1, \ldots, a_{O^{CARP}-1}$ and if there is no CARP for transmission on PUCCH, set $O^{CARP}=0$; and (2) the CSI fields of all CSI reports are mapped to the UCI bit sequence $a_{O^{CARP}}, a_{O^{CARP}+1}, \ldots, a_{O^{CARP}+O^{CSI}-1}$.

In another example, if at least one of the CSI reports for transmission on a PUCCH is of two parts, two UCI bit sequences $a_0^{(1)}, a_1^{(1)}, \ldots, a_{A^{(1)}-1}^{(1)}$ and $a_0^{(2)}, a_1^{(2)}, \ldots, a_{A^{(2)}-1}^{(2)}$ can be determined according to the following, where $A^{(1)} = O^{CARP} + O^{CSI-part1}$ and $A^{(2)} = O^{CSI-part2}$: (1) if there is CARP for transmission on PUCCH, the CARP bits are mapped to the UCI bit sequence $a_0^{(1)}, a_1^{(1)}, \ldots, a_{O^{CARP}-1}^{(1)}$ and if there is no CARP for transmission on PUCCH, set $O^{CARP}=0$; (2) the CSI fields of the first part of CSI in all CSI reports are mapped to the UCI bit sequence $a_{O^{CARP}}^{(1)}, a_{O^{CARP}+1}^{(1)}, \ldots, a_{O^{CARP}+O^{CSI-part1}-1}^{(1)}$; (3) the CSI fields of the second part of CSI in all CSI reports are mapped to the UCI bit sequence $a_0^{(2)}, a_1^{(2)}, \ldots, a_{A^{(2)}-1}^{(2)}$. If the length of the UCI bit sequence $a_0^{(2)}, a_1^{(2)}, \ldots, a_{A^{(2)}-1}^{(2)}$ is less than X bits (e.g., X=3), zeros may be appended to the bit sequence until its length equals X bits.

In another embodiment, the CARP can be multiplexed with CSI and HARQ-ACK or SR, and included in the UCI. In one example, if none of the CSI reports for transmission on a PUCCH is of two parts, the UCI bit sequence $a_0, a_1, \ldots, a_{A-1}$ can be determined according to the following, where $A = O^{ACK} + O^{SR} + O^{CARP} + O^{CSI}$: (1) if there is HARQ-ACK for transmission on PUCCH, the HARQ-ACK bits are mapped to the UCI bit sequence $a_0, a_1, \ldots, a_{O^{ACK}-1}$ and if there is no HARQ-ACK for transmission on PUCCH, set $O^{ACK}=0$; (2) if there is SR for transmission on PUCCH, the SR bits are mapped to the UCI bit sequence $a_{O^{ACK}}, a_{O^{ACK}+1}, \ldots, a_{O^{ACK}+O^{SR}-1}$ and if there is no SR for transmission on PUCCH, set $O^{SR}=0$; (3) if there is CARP for transmission on PUCCH, the CARP bits are mapped to the UCI bit sequence $a_{O^{ACK}+O^{SR}}, a_{O^{ACK}+O^{SR}+1}, \ldots, a_{O^{ACK}+O^{SR}+O^{CARP}-1}$; (4) the CSI fields of all CSI reports are mapped to the UCI bit sequence $a_{O^{ACK}+O^{SR}+O^{CARP}}, a_{O^{ACK}+O^{SR}+O^{CARP}+1}, \ldots, a_{O^{ACK}+O^{SR}+O^{CARP}+O^{CSI}-1}$.

In another example, if at least one of the CSI reports for transmission on a PUCCH is of two parts, two UCI bit sequences $a_0^{(1)}, a_1^{(1)}, \ldots, a_{A^{(1)}-1}^{(1)}$ and $a_0^{(2)}, a_1^{(2)}, \ldots, a_{A^{(2)}-1}^{(2)}$ can be determined according to the following, where $A^{(1)} = O^{ACK} + O^{SR} + O^{CARP} + O^{CSI-part1}$ and $A^{(2)} = O^{CSI-part2}$: (1) if there is HARQ-ACK for transmission on PUCCH, the HARQ-ACK bits are mapped to the UCI bit sequence $a_0^{(1)}, a_1^{(1)}, \ldots, a_{O^{ACK}-1}^{(1)}$ and if there is no HARQ-ACK for transmission on PUCCH, set $O^{ACK}=0$; (2) if there is SR for transmission on PUCCH, the SR bits are mapped to the UCI bit sequence $a_{O^{ACK}}^{(1)}, a_{O^{ACK}+1}^{(1)}, \ldots, a_{O^{ACK}+O^{SR}-1}^{(1)}$ and if there is no SR for transmission on PUCCH, set $O^{SR}=0$; (3) if there is CARP for transmission on PUCCH, the CARP bits are mapped to the UCI bit sequence $a_{O^{ACK}+O^{SR}}^{(1)}, a_{O^{ACK}+O^{SR}+1}^{(1)}, \ldots, a_{O^{ACK}+O^{SR}+O^{CARP}-1}^{(1)}$ and if there is no CARP for transmission on PUCCH, set $O^{CARP}=0$; (4) the CSI fields of the first part of CSI in all CSI reports are mapped to the UCI bit sequence $a_{O^{ACK}+O^{SR}+O^{CARP}}^{(1)}, a_{O^{ACK}+O^{SR}+O^{CARP}+1}^{(1)}, \ldots, a_{O^{ACK}+O^{SR}+O^{CARP}+O^{CSI-part1}-1}^{(1)}$; (5) the CSI fields of the second part of CSI in all CSI reports are mapped to the UCI bit sequence $a_0^{(2)}, a_1^{(2)}, \ldots, a_{A^{(2)}-1}^{(2)}$. If the length of the UCI bit sequence $a_0^{(2)}, a_1^{(2)}, \ldots, a_{A^{(2)}-1}^{(2)}$ is less than X bits (e.g., X=3), zeros may be appended to the bit sequence until its length equals X bits.

In yet another example, if none of the CSI reports for transmission on a PUCCH is of two parts, the UCI bit sequence $a_0, a_1, \ldots, a_{A-1}$ can be determined according to the following, where $A = O^{ACK} + O^{SR} + O^{CARP} + O^{CSI}$: (1) if there is CARP for transmission on PUCCH, the CARP bits are mapped to the UCI bit sequence $a_0, a_1, \ldots, a_{O^{CARP}-1}$ and if there is no CARP for transmission on PUCCH, set $O^{CARP}=0$;

(2) if there is HARQ-ACK for transmission on PUCCH, the HARQ-ACK bits are mapped to the UCI bit sequence $a_{O^{CARP}}$, $a_{O^{CARP}+1}, \ldots, a_{O^{CARP}+O^{ACK}-1}$ and if there is no HARQ-ACK for transmission on PUCCH, set $O^{ACK}=0$; (3) if there is SR for transmission on PUCCH, the SR bits are mapped to the UCI bit sequence $a_{O^{CARP}+O^{ACK}}$, $a_{O^{CARP}+O^{ACK}+1}, \ldots, a_{O^{CARP}+O^{ACK}+O^{SR}-1}$ and if there is no SR for transmission on PUCCH, set $O^{SR}=0$; (4) the CSI fields of all CSI reports are mapped to the UCI bit sequence $a_{O^{ACK}+O^{SR}+O^{CARP}}$, $a_{O^{ACK}+O^{SR}+O^{CARP}+1}, \ldots, a_{O^{ACK}+O^{SR}+O^{CARP}+O^{CSI}-1}$.

In yet another example, if at least one of the CSI reports for transmission on a PUCCH is of two parts, two UCI bit sequences $a_0^{(1)}, a_1^{(1)}, \ldots, a_{A^{(1)}-1}^{(1)}$ and $a_0^{(2)}, a_1^{(2)}, \ldots, a_{A^{(2)}-1}^{(2)}$ can be determined according to the following, where $A^{(1)}=O^{ACK}+O^{SR}+O^{CARP}+O^{CSI-part1}$ and $A^{(2)}=O^{CSI-part2}$: (1) if there is CARP for transmission on PUCCH, the CARP bits are mapped to the UCI bit sequence $a_0^{(1)}$, $a_1^{(1)}, \ldots, a_{O^{CARP}-1}^{(1)}$; (2) if there is HARQ-ACK for transmission on PUCCH, the HARQ-ACK bits are mapped to the UCI bit sequence $a_{O^{CARP}}^{(1)}$, $a_{O^{CARP}+1}^{(1)}, \ldots, a_{O^{CARP}+O^{ACK}-1}^{(1)}$ and if there is no HARQ-ACK for transmission on PUCCH, set $O^{ACK}=0$; (3) if there is SR for transmission on PUCCH, the SR bits are mapped to the UCI bit sequence $a_{O^{CARP}+O^{ACK}}^{(1)}$, $a_{O^{CARP}+O^{ACK}+1}^{(1)}, a_{O^{CARP}+O^{ACK}+O^{SR}-1}^{(1)}$ and if there is no SR for transmission on PUCCH, set $O^{SR}=0$; (4) the CSI fields of the first part of CSI in all CSI reports are mapped to the UCI bit sequence $a_{O^{ACK}+O^{SR}+O^{CARP}}^{(1)}$, $a_{O^{ACK}+O^{SR}+O^{CARP}+1}^{(1)}, \ldots, a_{O^{ACK}+O^{SR}+O^{CARP}+O^{CSI-part1}-1}^{(1)}$, (5) the CSI fields of the second part of CSI in all CSI reports are mapped to the UCI bit sequence $a_0^{(2)}, a_1^{(2)}, \ldots, a_{A^{(2)}-1}^{(2)}$. If the length of the UCI bit sequence $a_0^{(2)}, a_1^{(2)}, \ldots, a_{A^{(2)}-1}^{(2)}$ is less than X bits (e.g., X=3), zeros may be appended to the bit sequence until its length equals X bits.

In yet another example, if none of the CSI reports for transmission on a PUCCH is of two parts, the UCI bit sequence $a_0, a_1, \ldots, a_{A-1}$ can be determined according to the following, where $A=O^{ACK}+O^{SR}+O^{CARP}+O^{CSI}$: (1) if there is HARQ-ACK for transmission on PUCCH, the HARQ-ACK bits are mapped to the UCI bit sequence $a_0, a_1, \ldots, a_{O^{ACK}-1}$ and if there is no HARQ-ACK for transmission on PUCCH, set $O^{ACK}=0$; (2) if there is CARP for transmission on PUCCH, the CARP bits are mapped to the UCI bit sequence $a_{O^{ACK}}, a_{O^{ACK}+1}, \ldots, a_{O^{ACK}+O^{CARP}-1}$ and if there is no CARP for transmission on PUCCH, set $O^{CARP}=0$; (3) if there is SR for transmission on PUCCH, the SR bits are mapped to the UCI bit sequence $a_{O^{CARP}+O^{ACK}}, a_{O^{CARP}+O^{ACK}+1}, \ldots, a_{O^{CARP}+O^{ACK}+O^{SR}-1}$ and if there is no SR for transmission on PUCCH, set $O^{SR}=0$; (4) the CSI fields of all CSI reports are mapped to the UCI bit sequence $a_{O^{ACK}+O^{SR}+O^{CARP}}$, $a_{O^{ACK}+O^{SR}+O^{CARP}+1}, \ldots, a_{O^{ACK}+O^{SR}+O^{CARP}+O^{CSI}-1}$.

In yet another example, if at least one of the CSI reports for transmission on a PUCCH is of two parts, two UCI bit sequences $a_0^{(1)}, a_1^{(1)}, \ldots, a_{A^{(1)}-1}^{(1)}$ and $a_0^{(2)}, a_1^{(2)}, \ldots, a_{A^{(2)}-1}^{(2)}$ can be determined according to the following, where $A^{(1)}=O^{ACK}+O^{SR}+O^{CARP}+O^{CSI-part1}$ and $A^{(2)}=O^{CSI-part2}$: (1) if there is HARQ-ACK for transmission on PUCCH, the HARQ-ACK bits are mapped to the UCI bit sequence $a_0^{(1)}, a_1^{(1)}, \ldots, a_{O^{ACK}-1}^{(1)}$ and if there is no HARQ-ACK for transmission on PUCCH, set $O^{ACK}=0$; (2) if there is CARP for transmission on PUCCH, the CARP bits are mapped to the UCI bit sequence $a_{O^{ACK}}^{(1)}$, $a_{O^{ACK}+1}^{(1)}, \ldots, a_{O^{ACK}+O^{CARP}-1}^{(1)}$ and if there is no CARP for transmission on PUCCH, set $O^{CARP}=0$; (3) if there is SR for transmission on PUCCH, the SR bits are mapped to the UCI bit sequence $a_{O^{CARP}+O^{ACK}}^{(1)}$, $a_{O^{CARP}+O^{ACK}+1}^{(1)}, \ldots, a_{O^{CARP}+O^{ACK}+O^{SR}-1}^{(1)}$ and if there is no SR for transmission on PUCCH, set $O^{SR}=0$; (4) the CSI fields of the first part of CSI in all CSI reports are mapped to the UCI bit sequence $a_{O^{ACK}+O^{SR}+O^{CARP}}^{(1)}$, $a_{O^{ACK}+O^{SR}+O^{CARP}+1}^{(1)}, \ldots, a_{O^{ACK}+O^{SR}+O^{CARP}+O^{CSI-part1}-1}^{(1)}$; (5) the CSI fields of the second part of CSI in all CSI reports are mapped to the UCI bit sequence $a_0^{(2)}, a_1^{(2)}, \ldots, a_{A^{(2)}-1}^{(2)}$. If the length of the UCI bit sequence $a_0^{(2)}, a_1^{(2)}, \ldots, a_{A^{(2)}-1}^{(2)}$ is less than X bits (e.g., X=3), zeros may be appended to the bit sequence until its length equals X bits.

In one embodiment, the CARP can be included in UCI and transmitted by a PUSCH. In one example, the CARP can be the only component included in the UCI. In another example, the UCI bit sequence $a_0, a_1, \ldots, a_{A-1}$ can be determined from the set of states or measurement results for channel access responses as the bit sequence $b_0, b_1, \ldots, b_{O^{CARP}-1}$, as described in the embodiments/examples in the present disclosure, wherein (1) if there is no CARP bit, set $a_0=0$, $a_1=0$, and $A=2$; (2) if there is only one CARP bit, set $a_0=b_0$, $a_1=0$, and $A=2$; (3) otherwise, $a_i=b_i$ and $A=O^{CARP}$.

In one example, the CARP can be multiplexed with HARQ-ACK and included in the UCI. In another example, the UCI bit sequence $a_0, a_1, \ldots, a_{A-1}$ can be determined according to the following, where $A=O^{CARP}+O^{ACK}$: (1) the CARP bits are mapped to the UCI bit sequence $a_0$, $a_1, \ldots, a_{O^{CARP}-1}$, wherein $a_i=b_i$ for $i=0, 1, \ldots, O^{CARP}-1$; (2) the HARQ-ACK bits are mapped to the UCI bit sequence $a_{O^{CARP}}, a_{O^{CARP}+1}, \ldots, a_{O^{CARP}+O^{ACK}-1}$. In another example, the UCI bit sequence $a_0, a_1, \ldots, a_{A-1}$ can be determined according to the following, where $A=O^{CARP}+O^{ACK}$: (1) the HARQ-ACK bits are mapped to the UCI bit sequence $a_0$, $a_1, \ldots, a_{O^{ACK}-1}$; (2) the CARP bits are mapped to the UCI bit sequence $a_{O^{ACK}}, a_{O^{ACK}+1}, \ldots, a_{O^{ACK}+O^{CARP}-1}$, wherein $a_{i+O^{ACK}}=b_i$ for $i=0, 1, \ldots, O^{CARP}-1$.

In another example, the CARP can be multiplexed with CG-UCI and included in the UCI. In one example, the UCI bit sequence $a_0, a_1, \ldots, a_{A-1}$ can be determined according to the following, where $A=O^{CARP}+O^{CG-UCI}$: (1) the CARP bits are mapped to the UCI bit sequence $a_0, a_1, \ldots, a_{O^{CARP}-1}$, wherein $a_i=b_i$ for $i=0, 1, \ldots, O^{CARP}-1$; (2) the CG-UCI bits are mapped to the UCI bit sequence $a_{O^{CARP}}, a_{O^{CARP}+1}, \ldots, a_{O^{CARP}+O^{CG-UCI}-1}$. In another example, the UCI bit sequence $a_0, a_1, \ldots, a_{A-1}$ can be determined according to the following, where $A=O^{CARP}+O^{CG-UCI}$: (1) the CG-UCI bits are mapped to the UCI bit sequence $a_0, a_1, \ldots, a_{O^{CG-UCI}-1}$; (2) the CARP bits are mapped to the UCI bit sequence $a_{O^{CG-UCI}}$, $a_{O^{CG-UCI}+1}, \ldots, a_{O^{CG-UCI}+O^{CARP}-1}$, wherein $a_{i+O^{CG-UCI}}=b_i$ for $i=0, 1, \ldots, O^{CARP}-1$.

In yet another example, the CARP can be multiplexed with CG-UCI and HARQ-ACK, and included in the UCI.

In one example, the UCI bit sequence $a_0, a_1, \ldots, a_{A-1}$ can be determined according to the following, where $A=O^{CARP}+O^{CG-UCI}+O^{ACK}$: (1) the CARP bits are mapped to the UCI bit sequence $a_0, a_1, \ldots, a_{O^{CARP}-1}$, wherein $a_i=b_i$ for $i=0$, $1, \ldots, O^{CARP}-1$; (2) the CG-UCI bits are mapped to the UCI bit sequence $a_{O^{CARP}}, a_{O^{CARP}+1}, \ldots, a_{O^{CARP}+O^{CG-UCI}-1}$; (3) the HARQ-ACK bits are mapped to the UCI bit sequence $a_{O^{CARP}+O^{CG-UCI}}, a_{O^{CARP}+O^{CG-UCI}+1}, \ldots, a_{O^{CARP}+O^{CG-UCI}+O^{ACK}-1}$.

In another example, the UCI bit sequence $a_0, a_1, \ldots, a_{A-1}$ can be determined according to the following, where $A=O^{CARP}+O^{CG-UCI}+O^{ACK}$: (1) the CG-UCI bits are mapped to the UCI bit sequence $a_0, a_1, \ldots, a_{O^{CG-UCI}-1}$; (2) the HARQ-ACK bits are mapped to the UCI bit sequence $a_{O^{CG-UCI}}, a_{O^{CG-UCI}+1}, \ldots, a_{O^{CG-UCI}+O^{ACK}-1}$; (3) the CARP bits are mapped to the UCI bit sequence $a_{O^{CG-UCI}+O^{ACK}}$, $a_{O^{CG-UCI}+O^{ACK}+1}, \ldots, a_{O^{CG-UCI}+O^{ACK}+O^{CARP}-1}$, wherein $a_{i+O^{CG-UCI}+O^{ACK}}=b_i$ for $i=0, 1, \ldots, O^{CARP}-1$.

In yet another example, the UCI bit sequence $a_0, a_1, \ldots, a_{A-1}$ can be determined according to the following, where $A=O^{CARP}+O^{CG-UCI}+O^{ACK}$: (1) the CG-UCI bits are mapped to the UCI bit sequence $a_0, a_1, \ldots, a_{O^{CG-UCI}-1}$; (2) the CARP bits are mapped to the UCI bit sequence $a_{O^{CG-UCI}}, a_{O^{CG-UCI}+1}, \ldots, a_{O^{CG-UCI}+O^{CARP}-1}$, wherein $a_{i+O^{CG-UCI}}=b_i$ for $i=0, 1, \ldots, O^{CARP}-1$; (3) the HARQ-ACK bits are mapped to the UCI bit sequence $a_{O^{CG-UCI}+O^{CARP}}, a_{O^{CG-UCI}+O^{CARP}+1}, \ldots, a_{O^{CG-UCI}+O^{CARP}+O^{ACK}-1}$.

In another example, the CARP can be multiplexed with CSI, and included in the UCI. In one example, the CARP bit sequence is multiplexed with the first part of CSI in all CSI reports, and mapped in the order of CARP bit sequence first and CSI second order, e.g., the first UCI bit sequence $a_0^{(1)}, a_1^{(1)}, \ldots, a_{A^{(1)}-1}^{(1)}$ is determined according to the following, where $A^{(1)}=O^{CARP}+O^{CSI-part1}$: (1) the CARP bits are mapped to the UCI bit sequence $a_0^{(1)}, a_1^{(1)}, \ldots, a_{O^{CARP}-1}^{(1)}$, wherein $a_i^{(1)}=b_i$ for $i=0, 1, \ldots, O^{CARP}-1$; (2) the first part of CSI bits are mapped to the UCI bit sequence $a_{O^{CARP}}^{(1)}, a_{O^{CARP}+1}^{(1)}, \ldots, a_{O^{CARP}+O^{CSI-part1}-1}^{(1)}$.

In yet another example, the CARP bit sequence is multiplexed with the second part of CSI in all CSI reports, and mapped in the order of CARP bit sequence first and CSI second order, e.g., the second UCI bit sequence $a_0^{(2)}, a_1^{(2)}, \ldots, a_{A^{(2)}-1}^{(2)}$ is determined according to the following, where $A^{(2)}=O^{CARP}+O^{CSI-part2}$: (1) The CARP bits are mapped to the UCI bit sequence $a_0^{(2)}, a_1^{(2)}, \ldots, a_{O^{CARP}-1}^{(2)}$, wherein $a_i^{(2)}=b_i$ for $i=0, 1, \ldots, O^{CARP}-1$; (2) the second part of CSI bits are mapped to the UCI bit sequence $a_{O^{CARP}}^{(2)}, a_{O^{CARP}+1}^{(2)}, \ldots, a_{O^{CARP}+O^{CSI-part2}-1}^{(2)}$.

In another embodiment, the CARP can be included in an uplink signal, e.g., an uplink reference signal. In one example, at least one of the following component is utilized to construct the uplink signal to carry CARP: (1) a ID for the CARP, e.g., $N_{ID}$; (2) an indication of the beam direction(s) for channel access response, wherein the indication method is according to the mentioned examples/embodiments in the present disclosure. For example, the channel access response $o_i^{CARP}$ or the set of channel access responses; or (3) an index indicating the timing of the RS, e.g., slot index and/or symbol index.

In one example, the uplink signal can be constructed by a pseudo random sequence with initial condition including at least one of the above components. In another example, the uplink signal can be constructed by a ZC-sequence with root index and/or cyclic shift and/or cover codes including at least one of above components. In yet another example, the uplink signal can be constructed by a M-sequence with cyclic shift including at least one of above components.

For illustrative purposes the steps of this algorithm are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system including a carrier operating with shared spectrum channel access, the BS comprising:
   a transceiver configured to transmit, to a user equipment (UE), a channel access request (CARQ) over a downlink channel, wherein the CARQ indicates information related to a set of beam directions to sense for channel access; and
   a processor operably coupled to the transceiver, the processor configured to determine a set of time or frequency domain resources for receiving uplink control information (UCI), wherein the UCI includes a channel access response (CARP) and the CARP includes a response to information indicated in the CARQ,
   wherein the transceiver is further configured to receive the UCI based on the determined set of time or frequency domain resources, and
   wherein the response includes a set of measurement results for responding to the set of beam directions to sense for channel access.

2. The BS of claim 1, wherein the response to the information indicated in the CARQ further includes a set of states for responding to a set of beam directions to sense for channel access.

3. The BS of claim 2, wherein the set of measurement result is based on at least one of an energy detection based channel sensing, a received signal strength indicator (RSSI) measurement, a reference signal received power (RSRP) measurement, a reference signal received quality (RSRQ) measurement, or a signal to interference and noise ratio (SINR) measurement.

4. The BS of claim 1, wherein at least one parameter to determine the set of time or frequency domain resources is based on:
   a one-to-one mapping between time or frequency domain resources for the CARQ and time or frequency domain resources for the CARP;
   an indication of the set of time or frequency domain resources in the CARQ; or
   an indication of the set of time or frequency domain resources in higher layer parameters.

5. The BS of claim 1, wherein the UCI further includes at least one of a hybrid automatic repeat request acknowledgement (HARQ-ACK), a scheduling request (SR), or channel state information (CSI).

6. The BS of claim 1, wherein the UCI is received in a physical uplink control channel (PUCCH).

7. A user equipment (UE) in a wireless communication system, the UE comprising:
   a transceiver configured to receive, from a base station (BS), a channel access request (CARQ) over a downlink channel, wherein the CARQ indicates information related to a set of beam directions to sense for channel access; and
   a processor operably coupled to the transceiver, the processor configured to:
      generate a channel access response (CARP), wherein the CARP includes a response to information indicated in the CARQ;
      include the CARP in uplink control information (UCI); and
      determine a set of time or frequency domain resources for transmitting the UCI, wherein the transceiver is further configured to transmit the UCI based on the determined set of time or frequency domain resources; and wherein the response includes a set of measurement results for responding to the set of beam directions to sense for channel access.

8. The UE of claim 7, wherein the response to the information indicated in the CARQ further includes a set of states for responding to a set of beam directions to sense for channel access.

9. The UE of claim 8, wherein the set of measurement result is based on at least one of an energy detection based channel sensing, a received signal strength indicator (RSSI) measurement, a reference signal received power (RSRP) measurement, a reference signal received quality (RSRQ) measurement, or a signal to interference and noise ratio (SINR) measurement.

10. The UE of claim 7, wherein at least one parameter to determine the set of time or frequency domain resources is based on:
- a one-to-one mapping between time or frequency domain resources for the CARQ and time or frequency domain resources for the CARP;
- an indication of the set of time or frequency domain resources in the CARQ; or
- an indication of the set of time or frequency domain resources in higher layer parameters.

11. The UE of claim 7, wherein the UCI further includes at least one of a hybrid automatic repeat request acknowledgement (HARQ-ACK), a scheduling request (SR), or channel state information (CSI).

12. The UE of claim 7, wherein the UCI is transmitted on a physical uplink control channel (PUCCH).

13. A method of operating a user equipment (UE) in a wireless communication system, the method comprising:
receiving, from a base station (BS), a channel access request (CARQ) over a downlink channel, wherein the CARQ indicates information related to a set of beam directions to sense for channel access;

generating a channel access response (CARP), wherein the CARP includes a response to information indicated in the CARQ;

including the CARP in uplink control information (UCI);

determining a set of time or frequency domain resources for transmitting the UCI; and transmitting the UCI based on the determined set of time or frequency domain resources, wherein the response includes a set of measurement results for responding to the set of beam directions to sense for channel access.

14. The method of claim 13, wherein the response to the information indicated in the CARQ further includes a set of states for responding to a set of beam directions to sense for channel access.

15. The method of claim 14, wherein the set of measurement result is based on at least one of an energy detection based channel sensing, a received signal strength indicator (RSSI) measurement, a reference signal received power (RSRP) measurement, a reference signal received quality (RSRQ) measurement, or a signal to interference and noise ratio (SINR) measurement.

16. The method of claim 13, wherein at least one parameter for determining the set of time or frequency domain resources is based on:
- a one-to-one mapping between time or frequency domain resources for the CARQ and time or frequency domain resources for the CARP;
- an indication of the set of time or frequency domain resources in the CARQ; or
- an indication of the set of time or frequency domain resources in higher layer parameters.

17. The method of claim 13, wherein:
the UCI further includes at least one of a hybrid automatic repeat request acknowledgement (HARQ-ACK), a scheduling request (SR), or channel state information (CSI), and
the UCI is transmitted on a physical uplink control channel (PUCCH).

* * * * *